INVENTORS
Richard W. Parker and
BY Edwin F. Oblinger
ATTORNEYS

April 26, 1960 R. W. PARKER ET AL 2,933,748
POWER OPERATED TOOL
Filed Sept. 11, 1957 5 Sheets-Sheet 3

INVENTORS
Richard W. Parker and
BY Edwin F. Oblinger

Schmieding and Fultz
ATTORNEYS

INVENTORS
Richard W. Parker and
BY Edwin F. Oblinger

Schmieding and Fultz
ATTORNEYS

INVENTORS
Richard W. Parker and
BY Edwin F. Oblinger
ATTORNEYS

United States Patent Office 2,933,748
Patented Apr. 26, 1960

2,933,748

POWER OPERATED TOOL

Richard W. Parker and Edwin F. Oblinger, Springfield, Ohio, assignors to Parker Sweeper Company, Springfield, Ohio, a corporation of Ohio Application September 11, 1957, Serial No. 683,377

3 Claims. (Cl. 15—79)

The present invention relates to a power operated tool in which a rotatable mechanism, on a horizontal axis, is adapted to be shifted arcuately about a horizontal axis so as to raise and lower the rotatable mechanism, and in which the prime mover, for the mechanism, is maintainable in its upright position although the rotatable mechanism is shifted arcuately. More specifically the present invention relates to a tool including a mechanism, which is adapted to be rotated about a horizontally extending axis such as the mechanism for driving a rotatable brush and in which the rotatable mechanism is adapted to be shifted arcuately about a horizontal axis so as to raise and lower the rotatable brush, and in which the prime mover, such as an internal combustion engine, for the mechanism, is maintainable in its upright position although the rotatable mechanism is shifted arcuately.

The tool of the present invention comprises a frame which carries a rotatable mechanism on a horizontal axis. A prime mover is pivotally carried by the frame and drives a rotatable driving element on an axis parallel with the rotatable driving mechanism. The driving element of the prime mover and the rotatable mechanism are operatively connected with one another, and the prime mover is pivoted to the frame on the same axis as that of the driving element.

More specifically, the tool of the present invention includes a rotatable driving mechanism having a horizontally extending axis and comprises the driving gear or pulley for, for example, a rotatable brush of a sweeper. Since it is desirable to, at times, raise or lower the brush, the driving element is mounted for arcuate movement, and, to maintain the brush connected with the prime mover, and too, for providing for maintaining the prime mover in an upright position, the prime mover is pivotally supported on the frame on the axis of the driving element thereof, which latter is connected to the driving mechanism of the tool.

Further objects and advantages will be apparent from the following description, reference being had to the accompanying drawings wherein preferred embodiments of the invention are illustrated.

In the drawings:

Fig. 7 is a fragmentary view taken on line 7—7 of Fig. 1;

Figure 1:
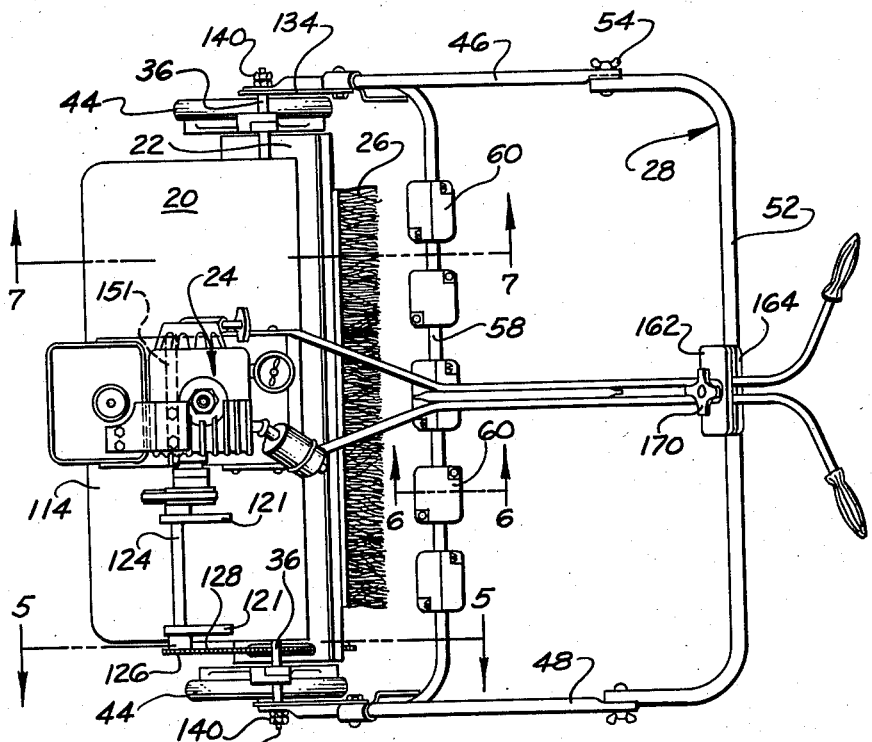
Fig. 1 is a top plan view of the power operated tool and is herein shown as a lawn sweeper.
Figure 2:
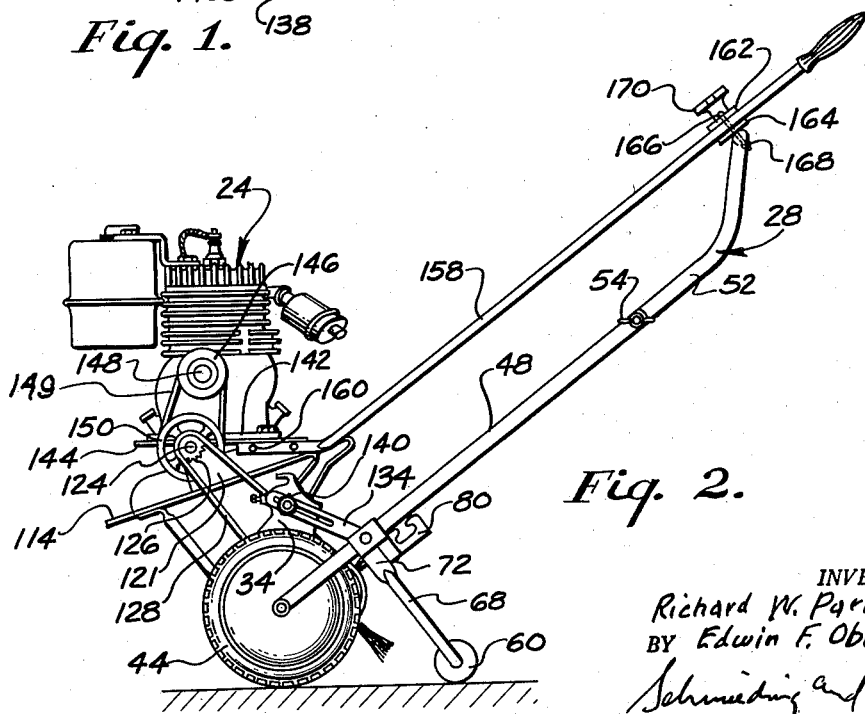
Fig. 2 is a left side view of the sweeper.

Referring more in detail to the drawings, the power operated tool 20 is herein shown, for illustrative purposes only, as a sweeper of the type having a rotating brush. The brush is operated by a prime mover, and, if desirable, the prime mover is also for driving the sweeper across the lawn, sidewalk, or floor to be swept. The lawn sweeper 20 includes a sweeping machine 21 which is driven by a prime mover, herein shown as in internal combustion engine 24. The rotatable brush of the machine 22 is shown at 26. The machine is guided by a handle 28.

The sweeping machine 22 includes a main frame 30, and this frame includes a right side plate 32 and a left side plate 34; these side plates are joined with one another by tie rods 36 and 38. These tie rods are held in position by set screws 40 which are screwed into the frame and impinge upon the tie rods. Aligned axles 42 are suitably secured to the side plates 32 and 34, and these axles carry wheels 44.

The handle includes two rearwardly and upwardly extending bars or pipes 46 and 48, the lower ends of which are pivotally mounted upon the axles 42 and are held from displacement in any suitable manner. The handle 28 also includes a C shaped section 52 having the ends thereof detachably secured to the upright sections 46 and 48 by bolts and wing nuts indicated generally at 54.

A C-shaped rod or pipe 56, having horizontally extending section 58, is arranged parallelly of the axis of the axles 42 and forms a bearing for a plurality of rollers 60. These rollers are formed as semi-cylinders which are notched as at 62 for receiving the head 64 of a screw 66 and these screws hold the semi-cylinders together to form the rollers. The C shaped pipe or rod 56 also includes upwardly and forwardly extending sections 68 which are flattened as at 70 and suitably secured to brackets 72. The brackets 72 are each provided with a cylindrical portion 74 and these brackets receive the extensions 46 and 48 of the handle. The brackets 72 are secured to the handle by bolts 76 and nuts 78.

The brackets 72 are also provided with hook portions 80 for receiving the rod 82 of the forward end of a debris receiving basket 84. The upper end of this basket 84 includes upwardly and rearwardly extending rods 86 connected at the top by section 88. This section 88 is connected by a hook 90 which hooks over the section 52 of the handle. The basket 84 also includes preferably a sheet metal base 92 and canvas walls 94, and these walls include opposite side walls 96 which are connected at the top to the rods 86 and at the bottom to the sheet metal floor 92, and includes also an integrally formed back 98 which is connected to the upper rod section 88 and also to the floor.

The side plates 32 and 34 are allochiral and each includes an inwardly extending ledge 100. The inner surface 102 of a hood 104 rests against the ledges 100 and the outer face 106 of the hood bears against the rear portion of the upper tie rod 36 and is another stationary part of the frame 30, at the bottom of the frame, and is herein shown as abutting the rear portions of arms 108. The hood 104 is formed of resilient material and is therefore yieldingly held in position by the ledges 100, the tie rod 36 and the arms 108.

The brush 26 is of the rotary type and is carried by a shaft 110. This shaft is driven by a gear 112. If desirable gearing can be arranged between the shaft 110 and the wheels 44 so as to drive the wheels forwardly as the brush 26 is rotated in a clockwise direction as viewed in Figs. 2, 4, 7, 8 and 9. Such driving gearing may be of the conventional type used in the Edwin D. Parker patent, Patent No. 2,654,106, issued October 6, 1953.

The frame 30 also includes a support comprising the platform 114 which has one end suitably connected, as by welding 116, to the tie rod 36 and the other end connected to the upper ends of arms 108 as by bolts and nuts shown generally at 118. The top of the platform carries spaced lugs 121 which support bearings 122. The axis of these bearings is parallel with the axis of the axles 42 and shaft 110. A shaft 124 is journaled in these bearings. The shaft 124 drives a gear 126 which gear is connected to gear 112 by pulley or chain 128.

It should also be observed here that the relationship between the gear 126 and gear 112 is always fixed. That is, the frame 30 including the side plates 32 and 34 together with the gear 112 and the gearing between shaft 110 and wheels 44 can be shifted about the axles 42, and, when so shifted, the bearings 122, being carried by the platform 114, will move in unison with shaft 110 and gear 112. Thus it will be apparent that the shaft 110 and the brush 26 carried thereby can be moved arcuately about the axis of the axles 42, to raise or lower the brush, yet maintaining a fixed relationship between the shaft 110, the gear 112 and the shaft 124 for gear 126. Two links 134 are provided, each having an end pivotally connected with the bolt 76. The links 134 are each provided with a slot 136 for receiving the threaded end 138 of upper tie rod 36. Nuts 140 clamp the links 134 against the side plates to hold the frame 30 in an adjusted position.

The prime mover, in the form of an internal combustion engine 24, includes a base 142 which in turn is carried by a platform 144. The engine 24 drives a pulley 146 which is fastened to the crankshaft 148. A pulley 150 is driven by crankshaft 148 through a belt 149. Pulley 150 is secured to the shaft 124 at the end opposite the gear 126. A shaft 151 is carried on the underside of the engine platform 144, and this shaft is journaled in space bearings 152. Bearings 152 are carried by a track 153 which latter is secured to the platform 114. Bearings 152 are adjusted, along the track 153, so that shaft 151 is in direct axial alignment with shaft 124. Thus the axes of shafts 124 and 151 coincide. These bearings are held in adjusted position by bolts 154.

Figure 8:
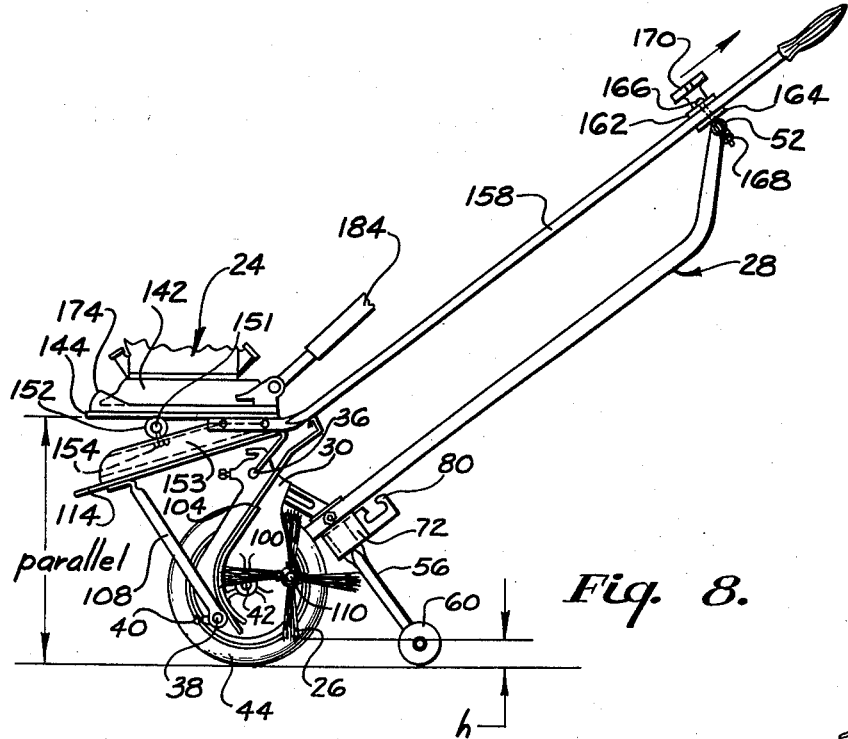
Fig. 8 is a diagrammatic view showing the brush adjusted substantially to its highest position.
Figure 9:
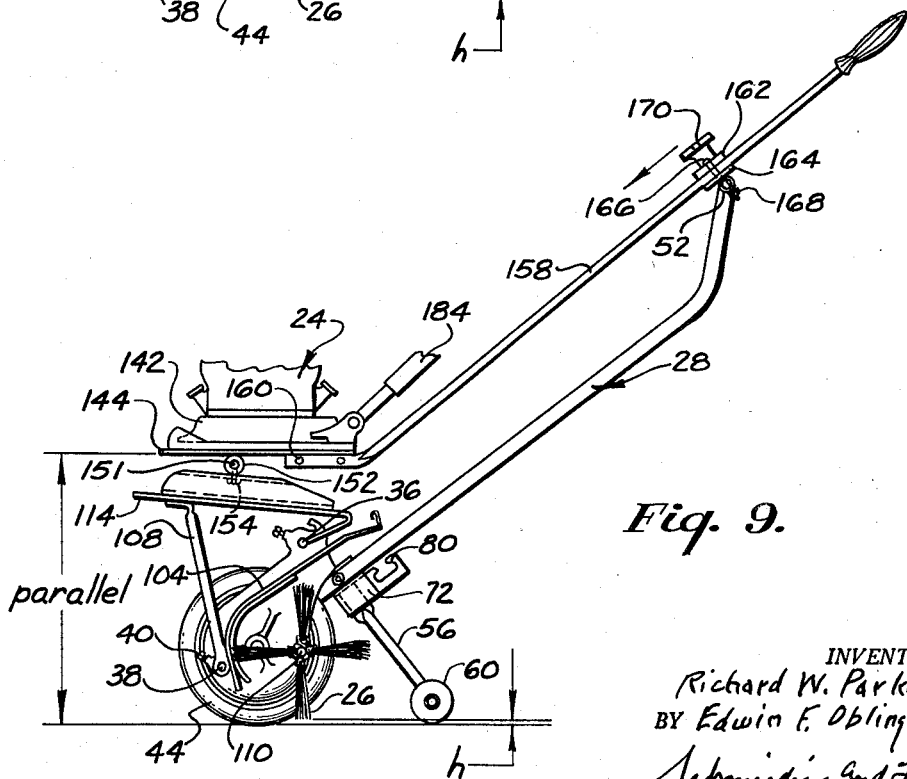
Fig. 9 is a view similar to Fig. 8 but showing the brush adjusted to substantially its lowermost position.

Thus, it will be understood that the internal combustion engine 24 is pivotally mounted on the axis of the shaft 151 which is aligned with the axis of the shaft 124, and as is seen from Figs. 8 and 9, the engine 24 can be maintained in an upright position throughout the full tilting capability of the frame 30. This is important, since these engines are designed for self-oiling if maintained in upright position, but the moving parts therein are insufficiently lubricated if tilted too far in either direction. The engine 24 can be moved relative to the platform 114 or track 120 through a handle 158 which is suitably secured to the platform 144 for the engine by bolts 160. The handle 158 is held in adjusted position by being adjustably secured to the handle section 52 of the sweeping machine. For this purpose there is provided two plates 162 and 164 disposed on opposite sides of the handle 158. Bolts 166 pass through the plate 162, the handle 158, plate 164 and handle section 52, and are held in place by nuts 168. Also the lower plate 164 is threaded to receive a hand screw 170 which, when tightened, clamps the handle 158 between the plates 162 and 164. Thus the engine is held in upright position regardless of the position of the frame 30.

Figure 3:
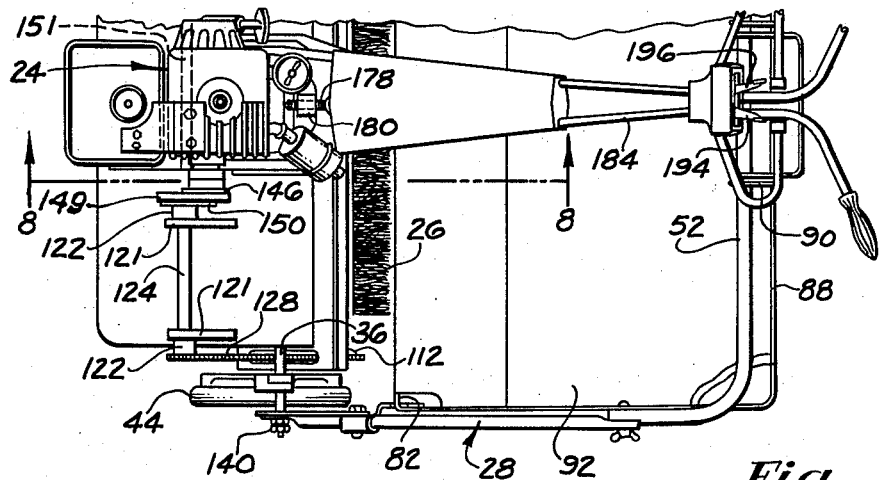
Fig. 3 is a view similar to Fig. 1 but showing another aspect of the present invention.
Figure 4:
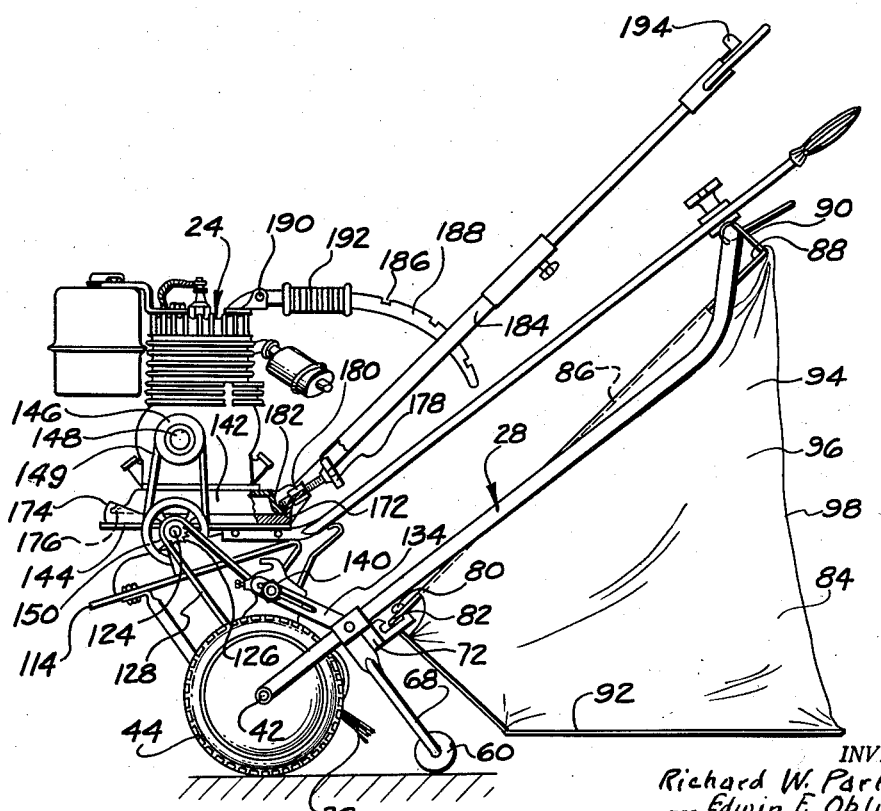
Fig. 4 is a left side view of the machine shown in Fig. 3.
Figure 5:
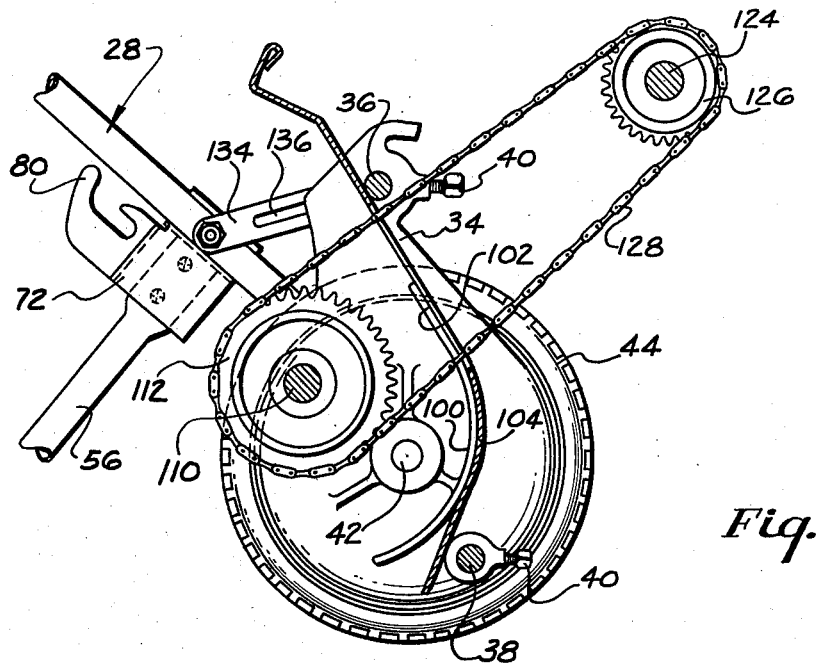
Fig. 5 is a fragmentary sectional view taken on line 5—5 of Fig. 1.
Figure 6:
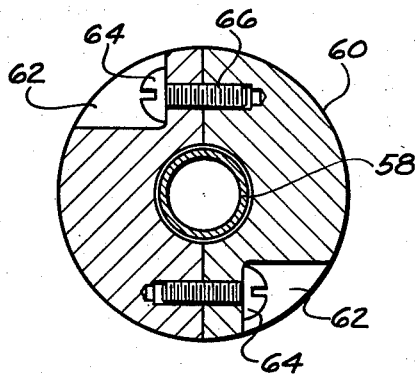
Fig. 6 is a fragmentary sectional view taken on line 6—6 of Fig. 1.
Figure 2:
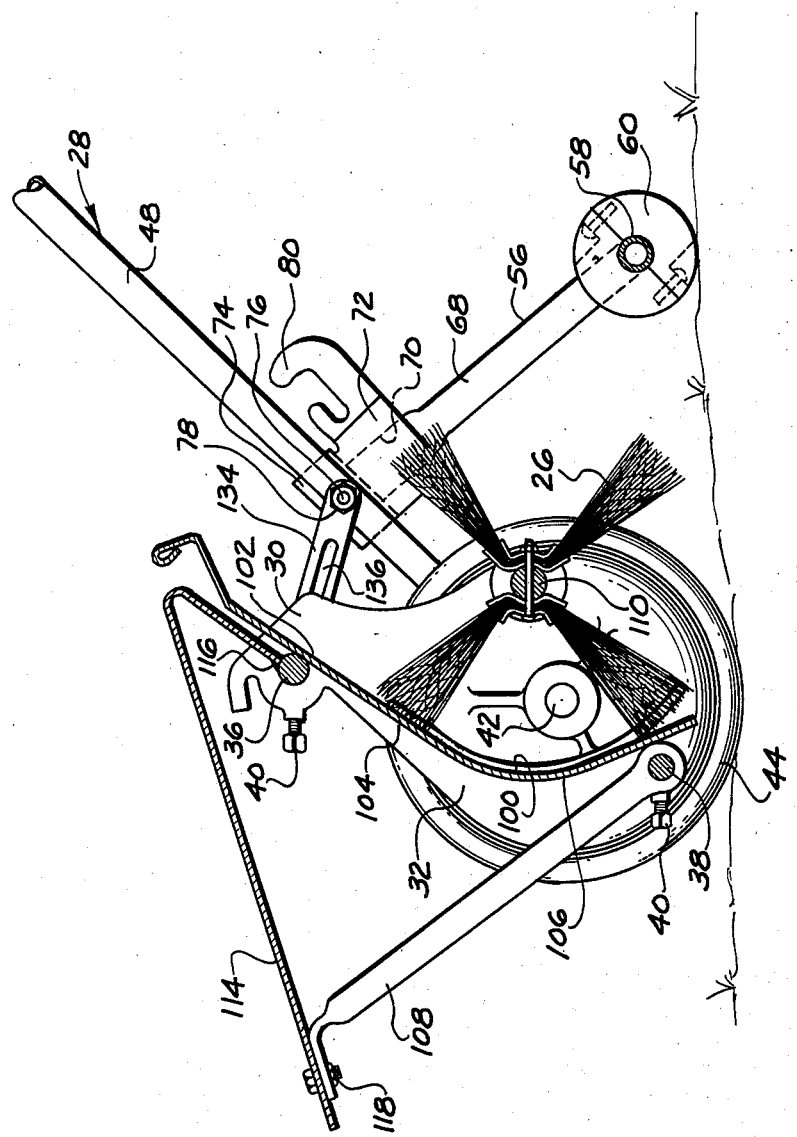

In the embodiment shown in Figs. 3 and 4 the power unit is shown as readily removable. In this embodiment a sub-base 172 is secured to the platform 144 and the nose part 174 overhangs the front edge 176 of the base 142. A screw 178 is threaded in through the rear wall 180 of the sub-base 172 and it bears against the rear section 182 of the base 146. By loosening the screw 178, the engine can be slid rearwardly so that the front edge 176 is withdrawn from underneath the nose 174 and the engine can then be lifted off the sub-base 172.

In this embodiment the lower end of the handle 184 is pivotally secured to the rear of the base 146 and can be held in position by a dog, not shown, which can be releasably held in position in one of a plurality of notches 186 of a bar 188. This bar is attached at 190 to the head of the engine and is provided with a handle section 192 interposed between the uppermost notch 186 and the point of attachment to the engine head. The length of the handle may be adjusted, since the upper part thereof telescopes with the lower part. Suitable clutch mechanism and throttle control, not shown, may be adjusted through levers 194 and 196. The power control shown in Figs. 3 and 4 is a standard product on the market and is used as a power element for driving various machines other than a lawn sweeper.

While the forms of embodiments herein shown and described constitute preferred forms, it is to be understood that other forms may be adopted falling within the scope of the claims that follow:

We claim:

1. In combination, a tool adapted to be moved over the earth including a frame, means for pivotally supporting the frame about an axis, a rotatable mechanism supported by the frame on an axis parallel with the first mentioned axis, a member extending rearwardly and upwardly from the frame; a support carried by the frame and movable with the frame about the first mentioned axis; a prime mover including a rotatable driving elements; driving mechanism connecting the driving element with the rotatable mechanism of the tool; means pivotally supporting the prime mover on the support at the axis of rotatable driving element, the axes of the rotatable mechanism and the pivotal means being parallel and being fixed relative to the frame; a member fixed to and extending rearwardly of the prime mover for moving the support about its pivotal means; means for adjustably locking said members with one another, one of said members providing a handle for manipulating the tool as it moves over the earth.

2. Mechanism as defined in claim 1, characterized in that the second mentioned member is moved relative to the first mentioned member when the locking means is ineffective and when the frame is moved about the first mentioned axis.

3. Mechanism as defined in claim 1, characterized in that the second mentioned member is moved relative to the first mentioned member when the locking means is ineffective and when the frame is moved about the first mentioned axis and further characterized by including means, in addition to the locking means, for locking the frame in a fixed position relative the first mentioned axis.

References Cited in the file of this patent

UNITED STATES PATENTS

| | | |
|---|---|---|
| 2,160,259 | Cooper | May 30, 1939 |
| 2,538,230 | Boggs | Jan. 16, 1951 |
| 2,695,071 | Hupp | Nov. 23, 1954 |
| 2,723,494 | Parker | Nov. 15, 1955 |
| 2,746,315 | Ertsgaard | May 22, 1956 |